US009595088B2

(12) United States Patent
Mohr et al.

(10) Patent No.: US 9,595,088 B2
(45) Date of Patent: Mar. 14, 2017

(54) METHOD OF, AND APPARATUS FOR, VISUALIZING MEDICAL IMAGE DATA

(71) Applicant: TOSHIBA MEDICAL SYSTEMS CORPORATION, Otawara-shi (JP)

(72) Inventors: Brian Mohr, Edinburgh (GB); Marco Razeto, Edinburgh (GB)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 309 days.

(21) Appl. No.: 14/085,292

(22) Filed: Nov. 20, 2013

(65) Prior Publication Data
US 2015/0139514 A1 May 21, 2015

(51) Int. Cl.
*G06K 9/00* (2006.01)
*G06T 5/50* (2006.01)
*G06T 11/60* (2006.01)
*G06K 9/46* (2006.01)

(52) U.S. Cl.
CPC ............... *G06T 5/50* (2013.01); *G06T 11/60* (2013.01); *G06K 9/4604* (2013.01); *G06T 2207/10081* (2013.01); *G06T 2207/20224* (2013.01); *G06T 2207/30004* (2013.01)

(58) Field of Classification Search
None
See application file for complete search history.

(56) References Cited

U.S. PATENT DOCUMENTS 6,771,736 B2   8/2004   Sabol et al.
7,432,924 B2   10/2008  Ohishi
7,995,824 B2 * 8/2011  Yim ........................ A61B 6/481
                                                   382/130
9,311,570 B2 * 4/2016  Mohr .................... G06T 7/0091
2004/0042677 A1 * 3/2004 Lee ..................... G06K 9/00456
                                                   382/254

(Continued)

FOREIGN PATENT DOCUMENTS

CN    1591477 A       3/2005
CN    101810485 A     8/2010
(Continued)

OTHER PUBLICATIONS

Office Action issued in Chinese Patent Application No. 201410387178.6 dated Oct. 10, 2016.

*Primary Examiner* — Nancy Bitar
(74) *Attorney, Agent, or Firm* — Oblon, McClelland, Maier & Neustadt, L.L.P.

(57) ABSTRACT

An apparatus for visualizing medical image data comprises a data processing unit for obtaining first image data representing a first medical image, second image data representing a second medical image, and subtraction image data representing a subtraction image, wherein the subtraction image data is generated by subtracting one of the first medical image data and the second medical image data from the other of the first medical image data and the second medical image data, and the apparatus further comprises a feature identification unit for processing the first image data representing the first medical image to identify a feature, and a rendering unit for rendering a combined image comprising an overlay of the identified feature from the first medical image data and one of the subtraction image and the second medical image.

25 Claims, 9 Drawing Sheets

(56) References Cited

U.S. PATENT DOCUMENTS

| | | | | |
|---|---|---|---|---|
| 2005/0046644 | A1* | 3/2005 | Ohishi | A61B 6/481 345/643 |
| 2006/0036167 | A1* | 2/2006 | Shina | A61B 6/12 600/433 |
| 2007/0053554 | A1* | 3/2007 | Fayad | A61B 5/055 382/128 |
| 2007/0160276 | A1* | 7/2007 | Chen | G06K 9/32 382/128 |
| 2009/0169076 | A1* | 7/2009 | Lobregt | A61B 5/055 382/128 |
| 2011/0050897 | A1* | 3/2011 | Cobb | G06K 9/00771 348/143 |
| 2013/0322724 | A1* | 12/2013 | Florent | A61B 6/12 382/132 |
| 2014/0112566 | A1* | 4/2014 | Steinberg | G06T 7/0022 382/131 |

FOREIGN PATENT DOCUMENTS

| | | |
|---|---|---|
| JP | 03-251971 | 11/1991 |
| JP | 2012-055392 | 3/2012 |

* cited by examiner

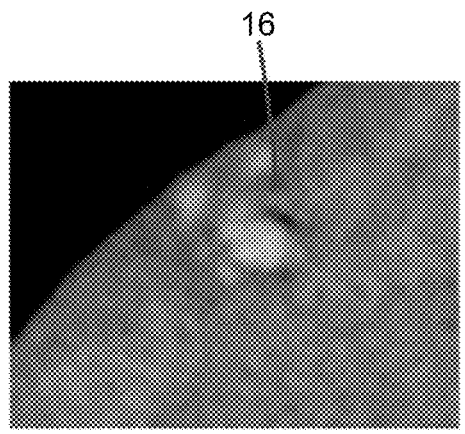 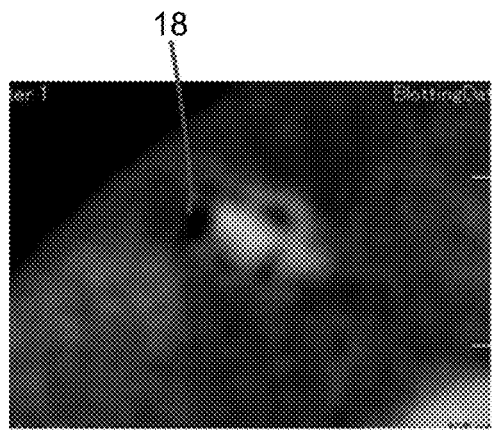
Fig. 2(a)　　　　　　　　Fig. 2(b)
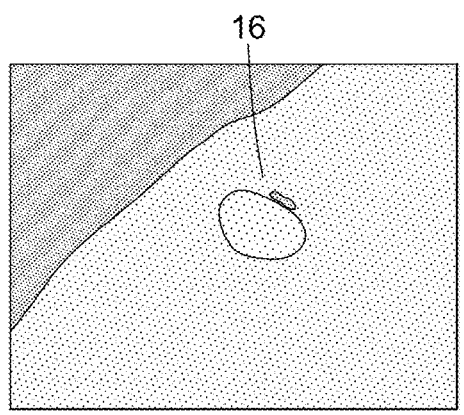 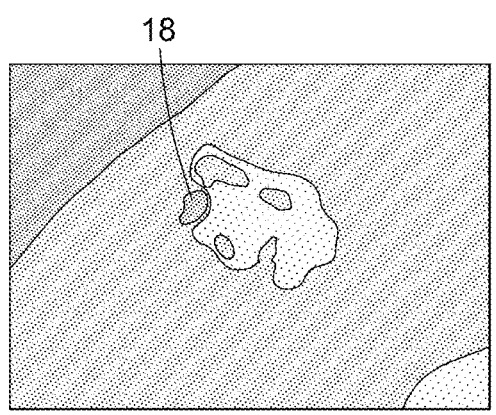
Fig. 2(ai)　　　　　　　　Fig. 2(bi)

METHOD OF, AND APPARATUS FOR, VISUALIZING MEDICAL IMAGE DATA

FIELD

Embodiments described herein relate generally to a method of, and apparatus for, visualizing medical image data. Embodiments have, for example, application to the understanding of artifacts in subtraction images.

BACKGROUND

In medical imaging, it is well-known to use a contrast agent to increase the intensity of the blood vessels as viewed in a computed tomography (CT) image. Subtraction is a frequently-used method of improving or clarifying the effect of contrast in a contrast-enhanced scan. A non-contrast scan (also known as a non-enhanced or pre-contrast scan) and a contrast-enhanced scan are obtained for a given vessel or vessels. The intensities of the non-contrast scan are subtracted from the intensities of the contrast-enhanced scan at each corresponding voxel location in the two scan volumes to remove features that are common to the contrast and the non-contrast scan (including, for example, bone and soft tissue) and to leave only the parts of the contrast image that have been enhanced by the contrast agent.

Some form of alignment between the data from the non-contrast scan and the data from the contrast-enhanced scan is usually necessary to ensure that the voxel locations of the two scans correspond anatomically.

Images may be aligned manually, also known as pixel shift. For example, a clinician may manually align contrast and pre-contrast images by overlaying the images and adjusting the position of one of the images relative to the other. Manual alignment is generally restricted to linear alignment and is dependent on the person aligning the images. However, manual alignment allows the clinician to see during the alignment process whether the contrast and pre-contrast images have been well-aligned, or whether there are any areas of the images in which the alignment is less good. The clinician's knowledge of the alignment process allows the clinician to judge whether the resulting subtraction image is reliable. If there are any artifacts in the subtraction image, the clinician may be able to determine whether such artifacts are a result of the alignment process, or whether they have a different cause.

Alternatively, the images may be aligned by mechanical alignment, for example in positron emission tomography-computed tomography (PCT/CT) or multispectral CT.

Modern systems may automatically align images using software. Using software allows images to be registered by linear or non-linear registration as appropriate. Software registration processes may be automatic, reproducible and allow more complex alignment methods than could be achieved by manual alignment. However, when subtraction images are generated by automatic registration, the clinician generally is not involved in the alignment of the images and therefore the clinician is unaware of the underlying accuracy of the alignment. The clinician may not readily be able to interpret artifacts in the subtraction image.

One application of subtraction of a non-contrast image from a contrast image is in imaging of the coronary arteries, known as coronary computed tomography angiography (CCTA). In CCTA, a contrast agent is introduced into the blood vessels. A non-contrast image is acquired when no contrast agent is present in the coronary arteries. A contrast image is acquired once the contrast agent is present in the coronary arteries. The contrast agent enhances the intensity of the coronary arteries.

In CCTA, subtraction is used to distinguish calcified plaque (calcifications) from the artery lumen. Subtraction may also be used to distinguish stents or any other similar high-intensity feature from the artery lumen. Bone is another high intensity feature that may be removed by subtraction.

In a non-contrast image, any calcification or stent has high intensity. The lumen has low intensity, which may be similar to the intensity of the surrounding soft tissue. In a contrast image, both the calcification or stent and the artery lumen have high intensity. In the case of the artery lumen, the high intensity is caused by the contrast agent. Calcifications, especially severe calcifications, impede the ability of a clinician to assess the CCTA data directly. The lumen is more difficult to interpret in the presence of calcified plaque, because both the lumen and the calcification appear as regions of high intensity.

It is desirable to subtract the non-contrast image from the contrast image. The subtraction removes calcifications or stents from the contrast image while retaining the enhancement of the lumen that is present in the contrast image.

FIG. 1(a) is a contrast (CCTA) image which includes a calcification 10 surrounding a vessel lumen 12. FIG. 1(b) shows a non-contrast image (for example, calcium score image) for the same vessel showing the same calcification. In the non-contrast image of FIG. 1(b) the lumen 12 may be difficult to distinguish from the background tissue because there is no enhancement of the lumen.

To remove the calcification 10 from the contrast image, the non-contrast image is subtracted from the contrast image by subtracting the intensities of the non-contrast data from the intensities of the contrast data at corresponding voxel locations in the two volumes.

FIG. 1(c) shows the subtraction image obtained by subtracting the image data corresponding to FIG. 1(b) from the image data corresponding to FIG. 1(a). In the subtraction image of FIG. 1(c), the lumen 12 may be seen more clearly than in the contrast image of FIG. 1(a) because the calcification 10 has been subtracted. Without the calcification 10, lumen 12 is easier to interpret, and the clinician can more easily estimate the lumen dimensions (for example, the lumen diameter) and the degree of stenosis.

It is known that artifacts may be present in subtracted image data. For example, in CT images in which calcium is subtracted, a common artifact is a dark spot or ring near the wall of a vessel. One possible cause of an artifact is a variation in intensity between the contrast scan and the non-contrast scan, which may be called a Hounsfield Unit (HU) variation. An HU variation artifact is not related to volume alignment, but instead is primarily a motion artifact related to the limitations of CT scanning technology. FIG. 2(a) is a subtraction image comprising an artifact 16 that is the result of HU variation.

An artifact may alternatively be caused by an error in registration. An error in alignment (for example, an error in software registration) may cause incorrect subtraction of HU values because the voxels in the contrast image are not correctly associated with the corresponding voxels in the non-contrast image. FIG. 2(b) is a subtraction image comprising an artifact 18 (a black region to the left of the lumen) that is the result of registration error, as well as artifacts caused by HU variation.

A further type of artifact that may be present in subtraction data is calcium blooming. Calcium blooming is an area of contrast-like intensity which may occur in an area of the image adjacent to the calcification. Calcium blooming makes the region of calcification look larger than its true physical extent. It is known that calcium blooming may be more significant in CCTA images than in non-contrast images.

Subtraction may also be used in applications other than those comparing contrast and non-contrast data. For example, subtraction may be used to compare images of perfusion.

BRIEF DESCRIPTION OF THE DRAWINGS

Embodiments are now described, by way of non-limiting example, and are illustrated in the following figures, in which:—

FIGS. 2(a) and 2(b) are images illustrating artifacts in subtracted data;

FIGS. 2(ai) and 2(bi) are versions of FIGS. 2(a) and 2(b) respectively in which colors have been rendered as shading effects;

DETAILED DESCRIPTION

Certain embodiments provide an apparatus for visualizing medical image data, comprising a data processing unit for obtaining first image data representing a first medical image, second image data representing a second medical image, and subtraction image data representing a subtraction image. The subtraction image data is generated by subtracting one of the first medical image data and the second medical image data from the other of the first medical image data and the second medical image data. The apparatus further comprises a feature identification unit for processing the first image data representing the first medical image to identify a feature, and a rendering unit for rendering a combined image comprising an overlay of the identified feature from the first medical image data and one of the subtracted image and the second medical image. The subtraction image may include at least one image artifact associated with a feature.

Certain embodiments provide a method for visualizing medical image data, comprising obtaining first image data representing a first medical image, second image data representing a second medical image, and subtraction image data representing a subtraction image. The subtraction image data is generated by subtracting one of the first medical image data and the second medical image data from the other of the first medical image data and the second medical image data. The method further comprises processing the image data representing the first medical image to identify a feature, and rendering a combined image comprising an overlay of the identified feature from the first medical image and one of the subtracted image and the second medical image. The subtraction image may include at least one image artifact associated with a feature.

An image artifact at a position in an image may be any feature of the image that is not a representation of the subject at that position but instead arises from the measurement process or apparatus, or image data processing, itself. An image artifact may be any type of extraneous feature in the image. An image artifact may arise, for example, from subtraction errors, registration errors, or measurement errors.

Figures 1A, 1B, 1C:
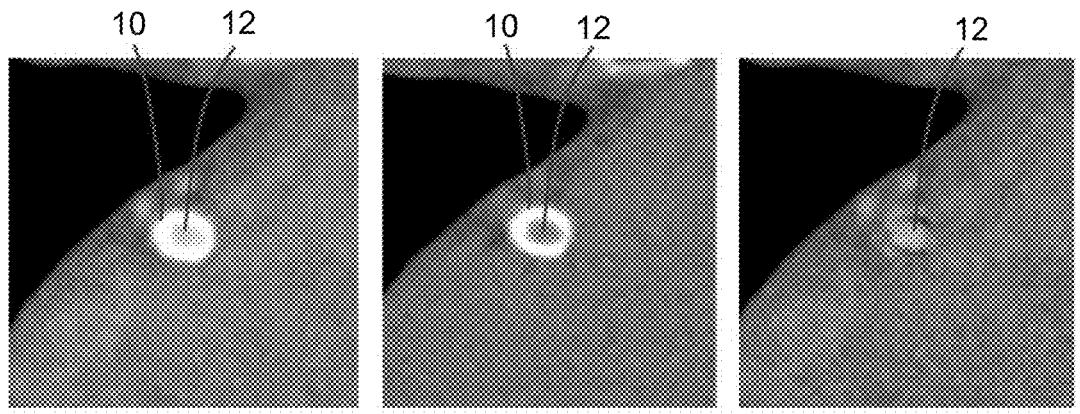
FIGS. 1(a), 1(b) and 1(c) represent a contrast-enhanced image, a non-contrast image, and a subtraction image respectively.
Figure 1:
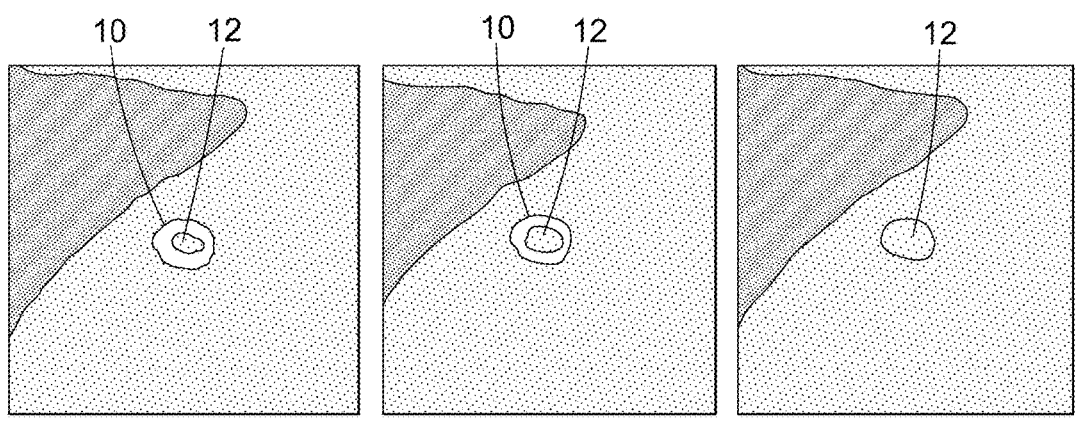
FIGS. 1(ai), 1(bi) and 1(ci) are versions of FIGS. 1(a), 1(b) and 1(c) respectively in which colors have been rendered as shading effects.
Figure 3:
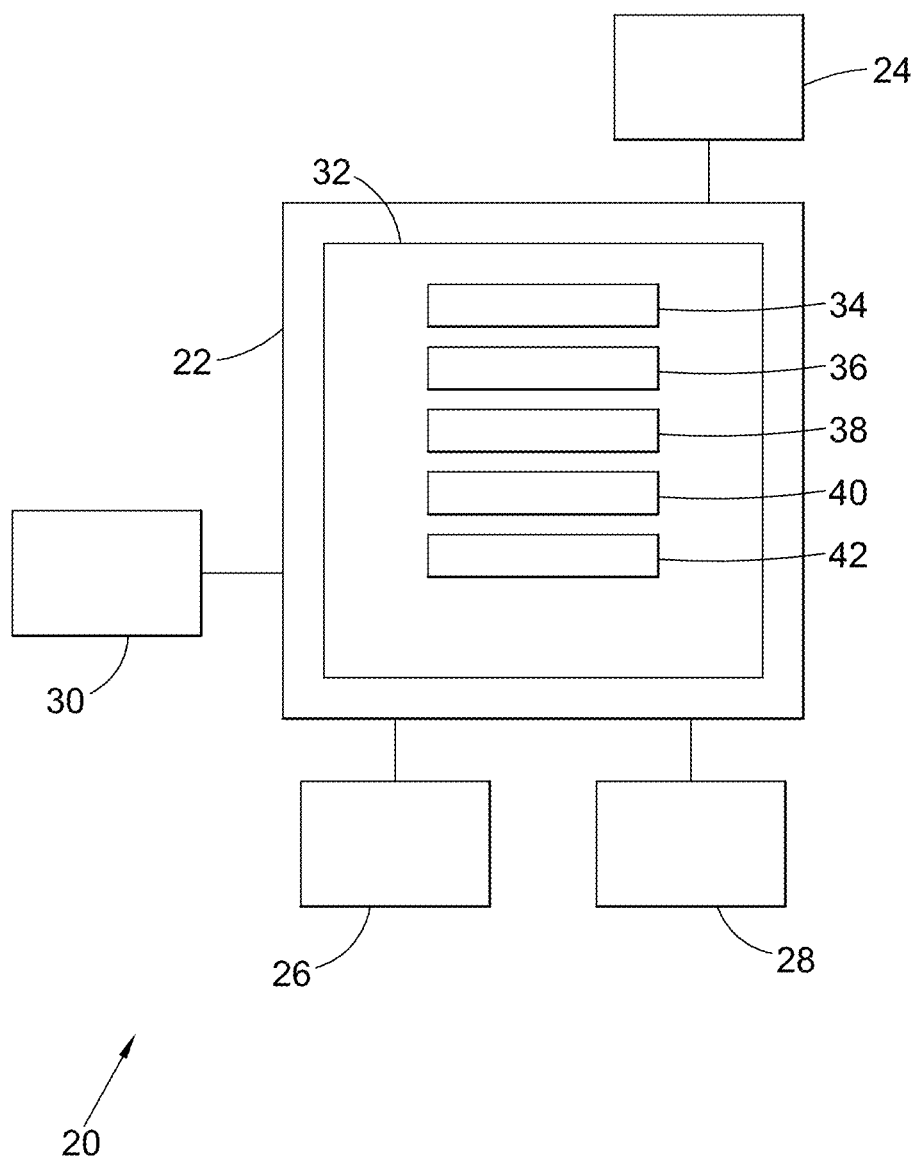
FIG. 3 is a schematic illustration of an apparatus according to an embodiment.

An apparatus 20 according to an embodiment is illustrated schematically in FIG. 3.

The apparatus 20 comprises a computing apparatus 22, in this case a personal computer (PC) or workstation, that is connected to a CT scanner 24, one or more display screens 26 and an input device or devices 28, such as a computer keyboard, mouse or trackball. In alternative embodiments, at least one display screen 26 is a touch screen, which also acts as the input device 28. In the present embodiment, the CT scanner 24 is one of the Toshiba Aquilion® range of CT scanners. The CT scanner 24 may instead be any CT scanner that is configured to obtain three-dimensional image data. In alternative embodiments, the CT scanner 24 may be replaced or supplemented by a scanner in any other imaging modality in which misregistration artifacts may be present, for example an MRI scanner, X-ray scanner or PET scanner.

In the present embodiment, sets of image data obtained by CT scanner 24 are stored in memory 30 and subsequently provided to computing apparatus 22. In an alternative embodiment, sets of image data are supplied from a remote data store (not shown) which may form part of a Picture Archiving and Communication System (PACS). The memory 30 or remote data store may comprise any suitable form of memory storage.

The computing apparatus 22 provides a processing resource for automatically or semi-automatically processing sets of image data. Computing apparatus 22 comprises a central processing unit (CPU) 32 that is operable to load and execute a variety of software modules or other software components that are configured to perform the method that is described below with reference to FIG. 4 and the method that is described below with reference to FIG. 5. In alternative embodiments, the apparatus may be configured to perform the method of FIG. 4 only, or the method of FIG. 5 only.

The computing apparatus 22 includes a data processing unit 34 for receiving medical images, a feature identification unit 36 for identifying relevant features within medical images, and a rendering unit 38 for rendering images, including overlay images, also referred to as combined images, that are described below with reference to the embodiments.

In the present embodiment, the computing apparatus 22 also includes a registration unit 40 and a subtraction unit 42.

In the present embodiment, the data processing unit 34, feature selection unit 36, rendering unit 38, registration unit 40 and subtraction unit 42 are each implemented in the computing apparatus 22 by means of a computer program having computer-readable instructions that are executable to perform the method of the embodiment. However, in other embodiments each unit may be implemented in software, hardware, or any suitable combination of hardware and software. In some embodiments, the various units may be implemented as one or more ASICs (application specific integrated circuits) or FPGAs (field programmable gate arrays). In further embodiments, one or more units may be implemented on a GPU (graphics processing unit).

The computing apparatus 22 also includes a hard drive and other components including RAM, ROM, a data bus, an operating system including various device drivers, and hardware devices including a graphics card. Such components are not shown in FIG. 3 for clarity.

Figure 4:
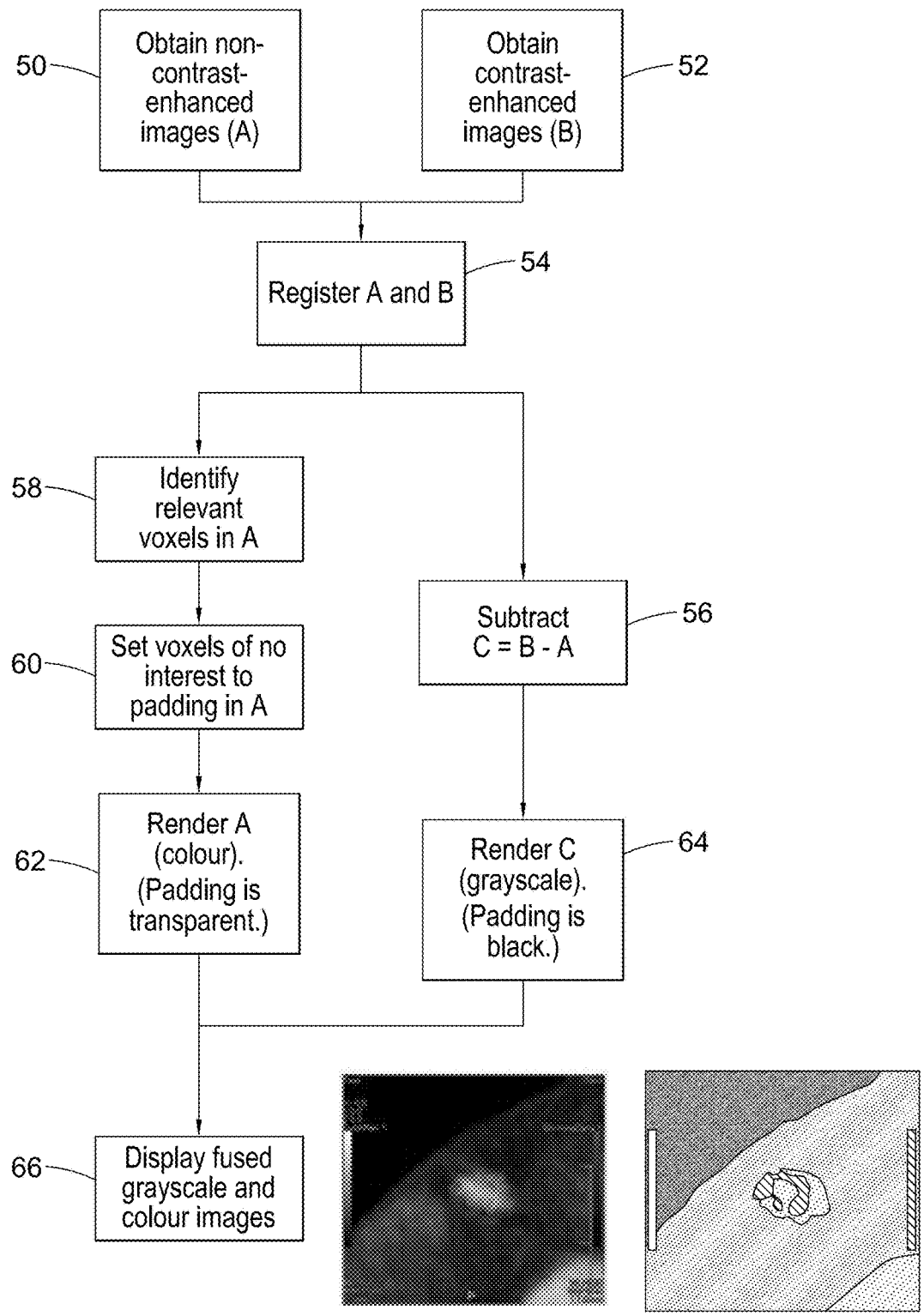
FIG. 4 is a flow chart illustrating in overview a first process performed in accordance with an embodiment, wherein part of a non-contrast image is overlaid on a subtracted image.

The system of FIG. 3 is configured to perform a process having a series of stages as illustrated in overview in the flow chart of FIG. 4.

At stage 50, the data processing unit 34 obtains non-contrast data in the form of a set of image data from a non-contrast CT scan (referred to in the flowchart as A) from the memory store 30 or from a remote data store, or from the scanner 24 directly. In the present embodiment, the non-contrast scan is a calcium score scan of the coronary arteries of a patient.

At stage 52, the data processing unit 34 obtains contrast data in the form of a set of image data from a contrasted CT scan of the same anatomical region of the same patient as was represented in the set of image data from the non-contrast scan obtained at stage 50. In the present embodiment, the contrast data set (referred to in the flowchart as B) is obtained from a CCTA scan of the coronary arteries of the patient which was taken as part of the same study as the non-contrast scan.

The contrast data may be referred to as first image data and the non-contrast data may be referred to as second image data, or vice versa. In further embodiments, different types of image data may be used instead of contrast and non-contrast data. The different types of image data may be any type of first image data and second image data for which subtraction of the first image data and the second image data is performed. At stage 54, the registration unit 40 automatically registers the non-contrast data set (A) with the contrast data set (B). Any suitable registration method may be used. In the present embodiment, the registration unit 40 performs a combination of non-rigid and rigid registration steps.

In alternative embodiments, the non-contrast data set (A) and the contrast data set (B) are already registered to each other when they are received by the data processing unit 34, and stage 54 may be omitted. In such embodiments, the apparatus 10 may exclude the registration unit 40.

At stage 56, the subtraction unit 42 subtracts the non-contrast data set (A) from the contrast data set (B) to obtain a set of subtraction image data representing a subtraction image (referred to in the flowchart as C). The subtraction comprises subtracting the intensity (CT number in HU) of each voxel of the non-contrast data set (A) from the intensity of the corresponding voxel in the contrast data set (B). The correspondence of the voxels is known from the registration process of stage 54.

In alternative embodiments, the sets of image data have been subtracted before they are supplied to the data processing unit at stages 40 and 42. In such embodiments, the set of image data for the subtraction image C may be supplied to the data processing unit 34 at stage 50 or 52, and stage 56 may be omitted. In such embodiments, the apparatus may not include the subtraction unit 42.

The subtraction image C may comprise one or more artifacts, for example subtraction artifacts similar to the artifacts shown in FIG. 2(a) and FIG. 2(b).

At stage 58, the feature identification unit 36 identifies at least one feature in the non-contrast data set (A). In the present embodiment, the identified feature is a region of calcification. The calcification appears in the non-contrast image as an area of high intensity. In alternative embodiments, the identified feature may be a stent, a region of bone, or a region of soft tissue (for example, a specific organ). The identified feature may, for example, be any feature that causes or is otherwise associated with an image artifact in the subtraction image.

In the present embodiment, the feature identification unit 36 identifies the region of calcification by applying an intensity threshold to the non-contrast data set (A). In the present embodiment, the intensity threshold is 180 HU. For each voxel, the feature identification unit 36 identifies whether the voxel meets the intensity threshold. Any voxel that meets or exceed the intensity threshold is determined to be part of a feature.

In alternative embodiments, the feature identification unit 36 identifies one or more features using an alternative method of feature identification, which may be an image processing method. For example, the feature identification may comprise a heart segmentation. In further embodiments, the feature identification unit 36 identifies features using more than one method of feature identification, for example using a heart segmentation in combination with an intensity threshold. Any suitable feature identification method or combination of methods may be used.

In further embodiments in which the identified feature is bone, the bone may be identified using a threshold or by any other suitable method. In other embodiments, for example those relating to perfusion studies, the identified feature may be a type of tissue. The means of identifying the relevant feature may comprise image analysis to obtain segmentation of the relevant anatomy. The relevant anatomy may be any appropriate anatomical region and is not restricted to studies of the heart.

In the present embodiment, the feature identification method is applied to the whole of the non-contrast data set (A). In alternative embodiments, the feature identification unit 36 identifies at least one feature by applying a feature identification method to a subset of the non-contrast data set. The subset of the non-contrast data set may correspond to a region of a non-contrast image, for example a region that contains an artifact.

At stage 60, the feature identification unit 36 sets to a default value, for example a padding value, any voxel in the non-contrast data set (A) that does not meet the intensity threshold. In the present embodiment, the feature identification unit 36 retains the original image values for voxels that have been determined to be part of the feature (those that meet the intensity threshold). Setting voxels that do not meet the intensity threshold to padding may remove most soft tissue from the non-contrast data set, and may leave only or predominantly calcium.

At stage 62, the rendering unit 48 renders the feature voxels of the non-contrast data set in color. In the present embodiment, the feature voxels are rendered in red. The color intensity used in the rendering of each voxel is dependent on the HU value of that voxel. In the present embodiment, a direct substitution is used where the red intensity in which the voxel is rendered equals the HU value of the voxel. However any suitable representation of variation of intensity may be used in alternative embodiments. The rendering unit 48 renders voxels that have been set to padding as transparent.

At stage 64, the rendering unit 38 renders the subtraction image C in grayscale. Padding in subtraction image C is rendered in black.

Although in the present embodiment, stages 58 to 62 follow stage 56 and are performed before stage 64, in further embodiments, stages 58 to 62 may precede both stages 56 and 64, may follow stages 56 and 64, or may occur simultaneously or be interleaved with stages 56 and 64.

At stage 66, the rendering unit 38 renders a combined image in which the feature from the non-contrast data set (rendered in color) and the subtracted data set (rendered in grayscale) are overlaid and displayed on the same image. In the present embodiment, the visualization is generated using fusion multi-planar rendering (MPR). In fusion MPR the image value of each voxel of the image is a combination of the image value of that voxel in the feature (which has been rendered in color at stage 54), and an image value of that voxel in the subtraction image C (which has been rendered in grayscale at stage 48). A resulting overlaid MPR image comprising a feature overlaid on the subtraction image is displayed on a display screen 26.

In alternative embodiments, the feature is rendered in grayscale and the subtraction image is rendered in color. In other embodiments, the feature and the subtraction image are rendered in different colors that provide a color contrast, or using any other visualization scheme that suitably distinguishes the feature from the subtraction image.

In fusion rendering, it is possible to use a fusion slider to set how the image value from the feature and the image value from the subtraction data are mixed. In the present embodiment, the fusion slider setting is set such that the contributions from the feature image value and the subtraction image value are equal. In further embodiments, a different setting for the fusion slider is used. In some embodiments, the user may control the fusion slider and set the desired fusion slider value. The rendering unit may also be configured to vary other aspects of the appearance of the combined image in response to user input. For example, the rendering unit may be configured to vary in the combined image and in response to user input, one or more of a fusion parameter, transparency, color or brightness of the feature or of the subtracted image or contrast or non-contrast image.

Identifying one or more calcification features, and displaying any calcification features overlaid onto the subtraction image so that the calcification feature may be visually distinguished from the subtraction image, allows the clinician to determine whether a dark ring or dark spot artifact in the subtraction image corresponds to the calcification.

In the present embodiment, the image values from the feature are not processed other than being thresholded and combined with the subtraction value in fusion rendering. Therefore the overlaid feature viewed by the clinician in the overlaid image may be taken to be a good representation of the calcification as seen in the non-contrast image, and not the result of significant image processing. The clinician may therefore have confidence in his or her understanding that the artifact corresponds to the calcification.

Figure 5:
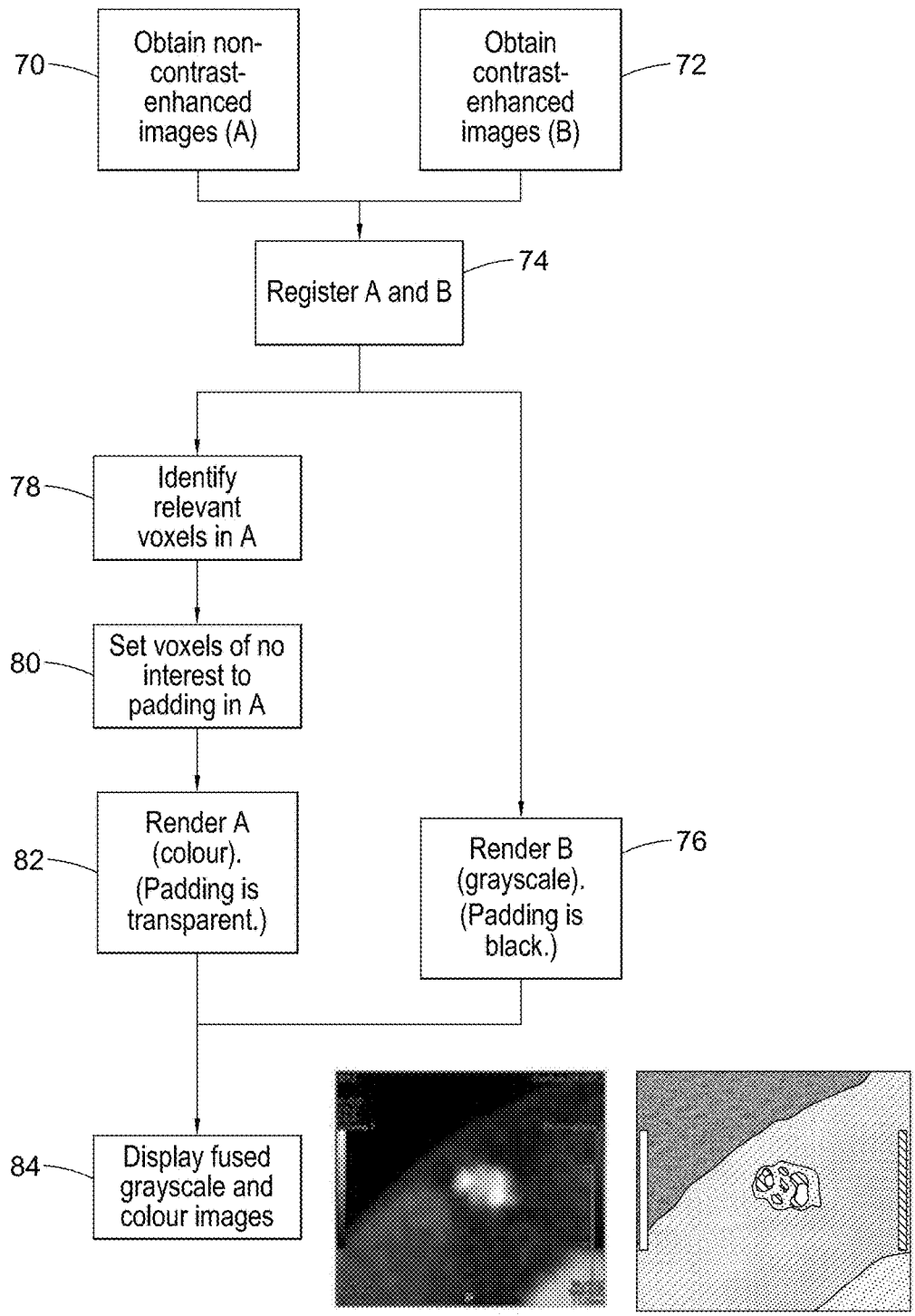
FIG. 5 is a flow chart illustrating in overview a second process performed in accordance with an embodiment, wherein part of a non-contrast image is overlaid on a contrasted image.

The system of FIG. 3 is also configured to perform a process having a series of stages as illustrated in overview in the flow chart of FIG. 5. In other embodiments, an apparatus performs only the process of FIG. 4 or the process of FIG. 5.

In the present embodiment, the same image data is used for the process of FIG. 5 as was used for the process of FIG. 4. The present embodiment uses non-contrast data and contrast data. Other embodiments use first image data and second image data that may be any data that is suitable for subtraction.

At stage 70 the data processing unit 34 receives the non-contrast data set (A) and at stage 72 the data processing unit 34 receives the contrast data set (B). At stage 74 the registration unit 40 registers the non-contrast data set (A) and the contrast data set (B). In alternative embodiments, the non-contrast data set (A) and the contrast data set (B) are already registered when they are received, and stage 74 is omitted.

At stage 76, the rendering unit 38 renders the contrast data set (B) in grayscale with padding set to black.

At stage 78, the feature identification unit 36 identifies one or more features in the non-contrast data set (A). In the present embodiment, the feature identification is achieved by setting an intensity threshold at 180 HU, wherein every voxel that meets or exceeds the intensity threshold is part of a feature. Any other suitable intensity threshold may be used in alternative embodiments or modes of operation. At stage 80, the feature identification unit 38 sets non-feature voxels (voxels that do not meet the intensity threshold) to a default value, for example a padding value. Padding values may subsequently be rendered as transparent or as background. At stage 82 the rendering unit renders in a color (for example, red) the voxels of the non-contrast data set (A) that form part of the feature, and renders the voxels that have been set to padding as transparent.

In the present embodiment, stages 78 to 82 of the process of FIG. 5 are the same as stages 60 to 64 of FIG. 4. Therefore in a related embodiment, in which both the process of FIG. 4 and the process of FIG. 5 are performed, stages 78 to 82 of the process of FIG. 5 are omitted, and the output of stage 64 of FIG. 4 is used as an input to stage 84 of FIG. 5.

Although stage 76 has been described as taking place before stages 78 to 82, stage 76 may take place after stages 78 to 82 or simultaneously with stages 78 to 82.

At stage 84, the rendering unit 38 renders a combined image using fusion MPR rendering. The image value of each voxel of the image is a combination of the image value of that voxel in the feature (which has been rendered in color at stage 82) and the image value of that voxel in the contrast data set (which has been rendered in grayscale at stage 76). The rendering unit 38 then displays the resulting image on the display screen 26. The resulting image represents any identified feature (in the present embodiment, a calcification) obtained from the non-contrast scan as an overlay on the contrasted (CCTA) image. Rendering the feature in color and the contrast image in grayscale allows the feature to be visually distinguished from the contrast image.

In alternative embodiments, the feature is rendered in grayscale and the contrast image is rendered in color. In other embodiments, contrasting colors or any other suitable visualization scheme are used to visually distinguish the feature from the contrast image, subtraction image or other image included in the combined image. For example, at least one of brightness, color, texture and shading may be different for the feature than for the contrast image, subtraction image or other image included in the combined image.

Overlaying a calcification feature from a non-contrast image onto the corresponding contrast image may allow the clinician to determine whether there is a good registration between the contrast image and the non-contrast image. If the registration is good, the calcification feature from the non-contrast image should be correctly overlaid on the calcification in the contrast image. If the registration is not good, it is expected that the calcification in the contrast image and the calcification in the non-contrast image may be offset, and only have a partial overlap. By viewing the overlay on the contrast image, the clinician may determine whether the registration of the contrast and non-contrast data sets is adequate. This may give the clinician similar confidence in the registration to the level of confidence achieved when aligning the images manually.

The subtraction overlay image resulting from the process of FIG. 4 and the contrast overlay image resulting from the process of FIG. 5 may be used in the assessment of artifacts in a subtraction image. The subtraction overlay image may allow the clinician to identify whether an artifact in the subtraction image is related to a calcification. The contrast overlay image may allow the clinician to determine whether there is good registration of the images. A first example of such overlay images is illustrated in FIG. 6.

Figure 6A:
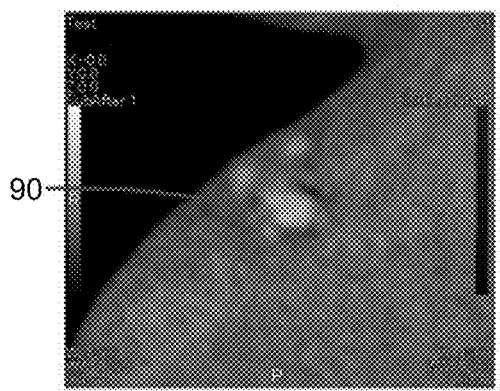
FIGS. 6(a), 6(b) and 6(c) are a first series of images illustrating an overlay of non-contrasted data on subtracted and contrasted images.
Figure 6:
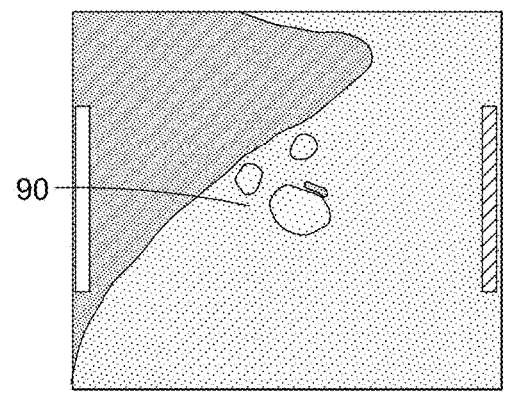
FIGS. 6(ai), 6(bi) and 6(ci) are versions of FIGS. 6(a), 6(b) and 6(c) respectively in which colors have been rendered as shading effects.

FIG. 6(a) is a subtraction image resulting from the subtraction of a non-contrast (in this case, calcium score) data set from a contrast (in this case, CCTA) data set. The subtraction image contains a dark ring artifact 90. On viewing the dark ring artifact 90, a clinician may wish to determine whether the dark ring artifact 90 is caused by a HU variation between the two scans (for example, due to motion), or whether the dark ring artifact 90 is caused by misregistration of the non-contrast image with the contrast image, causing the voxels to be aligned incorrectly for subtraction.

Figure 6B:
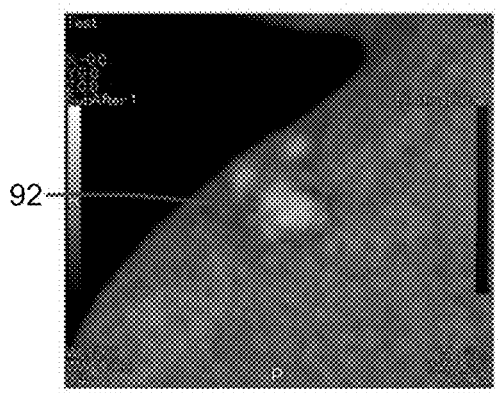
Figure 6:
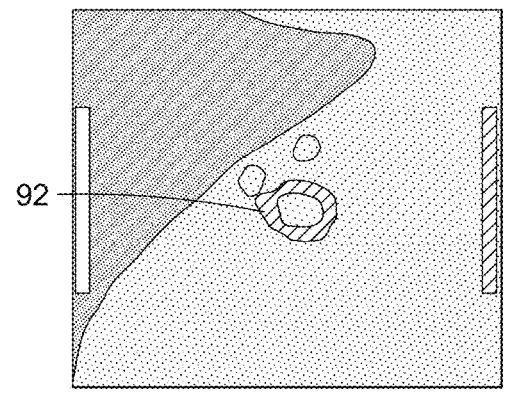

FIG. 6(b) represents an image produced by the process of FIG. 4, in which a feature 92 identified in the non-contrast data set (in the present embodiment, a calcification) is displayed in an overlay image with the subtraction image. The feature is rendered in color (in FIG. 6(b), the calcification is rendered in blue). By inspection of the overlaid image, the clinician may determine that the dark ring artifact 90 on the subtraction image corresponds to the location of the calcification 92 from the non-contrast image.

Figure 6C:
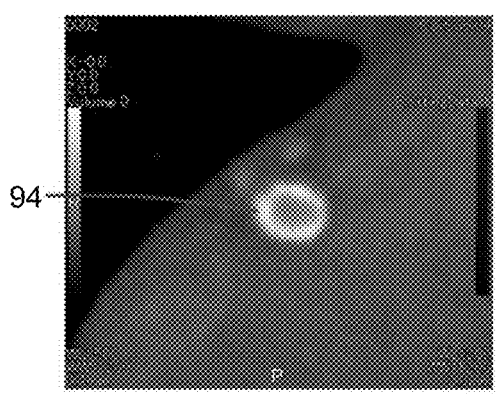
Figure 6:
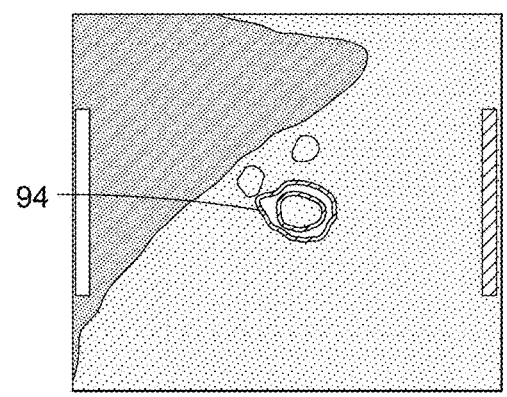

FIG. 6(c) represents an image produced by the process of FIG. 5, in which the feature identified in the non-contrast data set (in this case, a calcification) is displayed in an overlay image with the contrast (CCTA) image. In FIG. 6(c), the feature is rendered in blue. Any calcification should be present at high intensity in both the contrast data set and the non-contrast data set. If the data sets have been correctly aligned, the calcification visible in a non-contrast image should overlay the calcification that is visible in a corresponding contrast image. In FIG. 6(c) the calcification is well overlaid. The blue region corresponding to the calcification from the calcium score image is substantially the same as the high-intensity region 94 corresponding to the calcification from the CCTA image. By inspection of FIG. 6(c), the clinician may determine that the contrast data set and the non-contrast data set have a good registration to each other.

By examining the overlay of the calcification feature on the subtraction image the clinician may conclude that the artifact corresponds to a calcification. By examining the overlay of the feature on the contrast image, the clinician may conclude that there is a good registration. Therefore, the clinician may decide that the subtraction image of FIG. 6(a) can be read with high confidence, because the clinician has high confidence in the registration of the contrast data set with the non-contrast data set.

For example, the clinician may have confidence that the lumen diameter that can be read from the subtraction image accurately represents the diameter of the physical lumen.

Figure 7A:
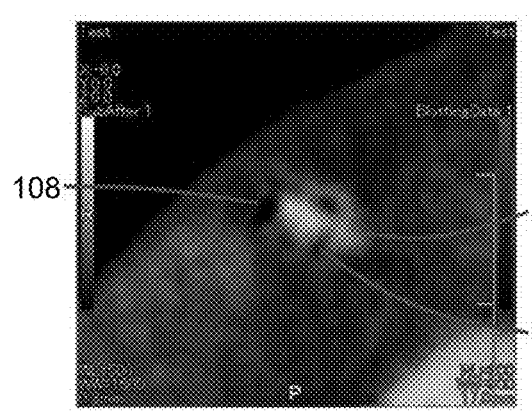
FIGS. 7(a), 7(b) and 7(c) are a second series of images illustrating an overlay of non-contrasted data on subtracted and contrasted images.
Figure 7:
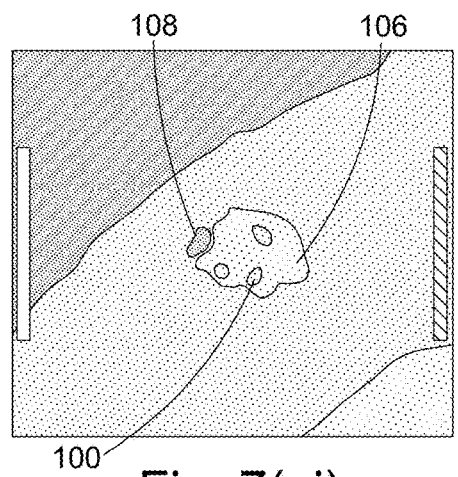
FIGS. 7(ai), 7(bi) and 7(ci) are versions of FIGS. 7(a), 7(b) and 7(c) respectively in which colors have been rendered as shading effects.

A second example of a set of images comprising a subtraction image, a subtraction overlay image and a CCTA overlay image is illustrated in FIG. 7. The images of FIG. 7 represent different sets of image data from those represented in the images of FIG. 6.

FIG. 7(a) represents a subtraction image that is obtained by subtracting a non-contrast data set from a contrast data set. FIG. 7(a) contains a dark ring artifact 100 and a black spot artifact 108 at the left of the lumen.

Figure 7B:
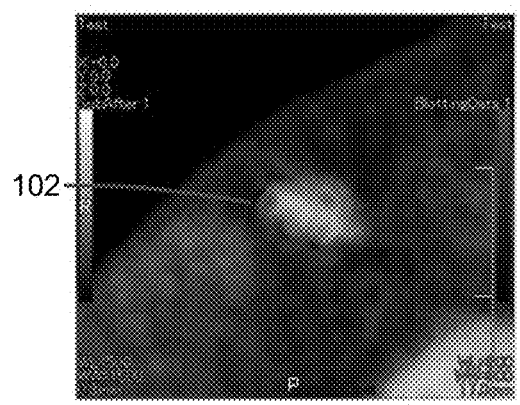
Figure 7:
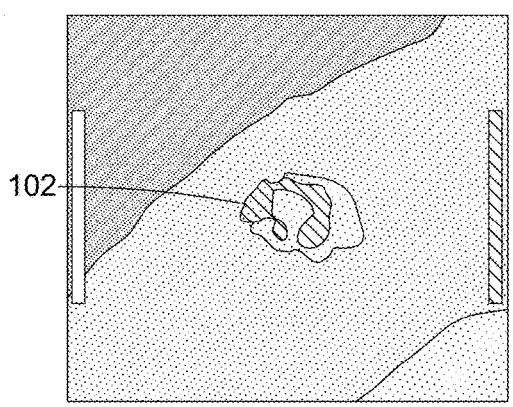

FIG. 7(b) represents an image in which the subtraction image (FIG. 7(a)) is overlaid with a calcification feature 102 that has been identified from the non-contrast data set. In FIG. 7(b), the feature 102 is rendered in red. The feature 102 may be seen to overlay the dark ring artifact of FIG. 7(a). Therefore the clinician may decide that the dark ring artifact relates to the calcification 102.

Figure 7C:
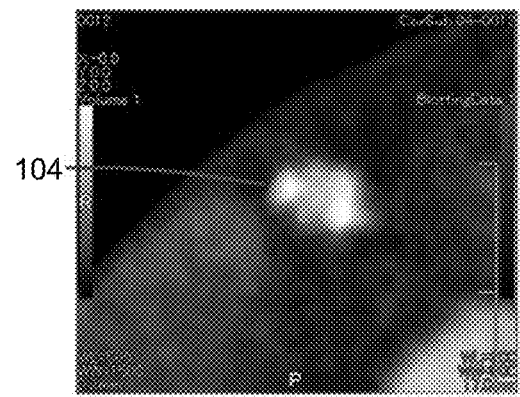
Figure 7:
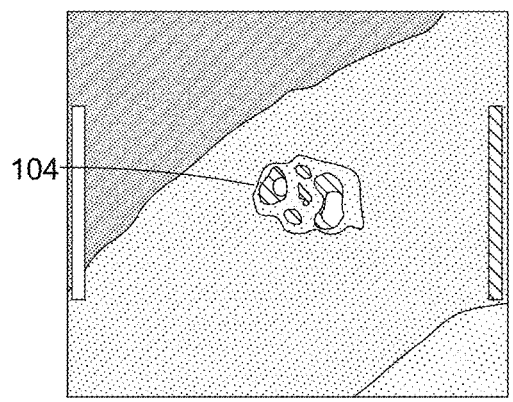

FIG. 7(c) represents an image in which the calcification feature is overlaid with the corresponding contrast image. If the images are well registered, it may be expected that the red region from the feature will coincide with the high intensity region in the contrast image that represents the calcification. However, FIG. 7(c) shows areas of red 104 that do not appear to coincide with the high intensity region. On viewing the image of FIG. 7(c), the clinician may decide that lack of overlap between the feature and the region of bright intensity in the contrast image indicates that there is a registration error. The clinician may conclude that the dark spot artifact 108 at the left of the lumen is a misregistration artifact. Therefore the clinician may decide to read the corresponding area of the subtraction image with caution. The clinician may conclude that the registration is too poor for the subtraction image to be used. Alternatively, the clinician may choose to continue to use the subtraction image, but with knowledge that at least part of the image may be somewhat misregistered. In some cases, the clinician or other operator may choose to re-register or otherwise re-align the images or image data sets, either manually or using an automated procedure.

Other artifacts that may be present in subtraction images include contrast-like intensities outside of the dark spots or rings. For example, in the subtraction image of FIG. 7(a) there is an area of contrast-like intensity 106 that is outside the dark ring 100.

Figure 8A:
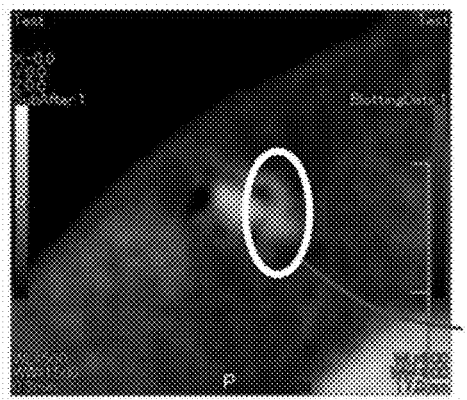
FIGS. 8(a), 8(b) and 8(c) comprise the images of FIGS. 7(a), 7(b) and 7(c) respectively with added highlighting of a region of calcium blooming.
Figure 8:
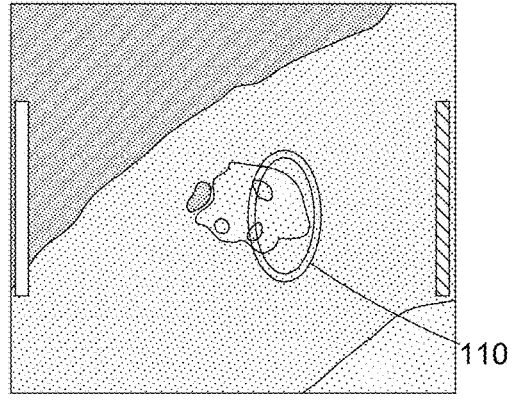
FIGS. 8(ai), 8(bi) and 8(ci) are versions of FIGS. 8(a), 8(b) and 8(c) respectively in which colors have been rendered as shading effects.

FIG. 8 represents the same images as FIG. 7, but on each image the area of contrast-like intensity 106 is highlighted by an oval 110.

As described above with reference to FIGS. 7(a) and 7(b), the clinician may determine that the dark ring 100 corresponds to the calcification feature 102. As the calcification feature is expected to border the outer wall of the vessel, the dark ring may be taken to indicate the boundary of the vessel. The clinician may therefore determine that anything outside the dark ring or calcification should not be part of the vessel.

Figure 8B:
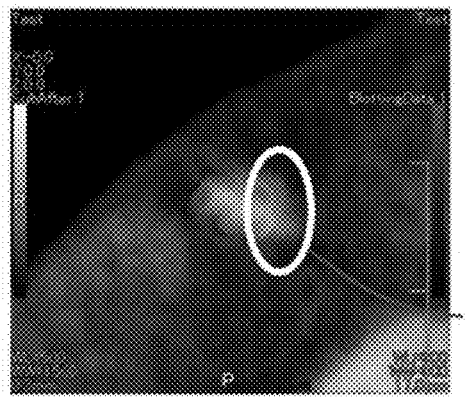
Figure 8:
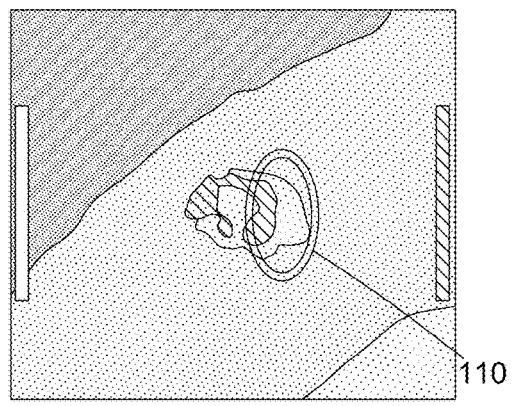
Figure 8C:
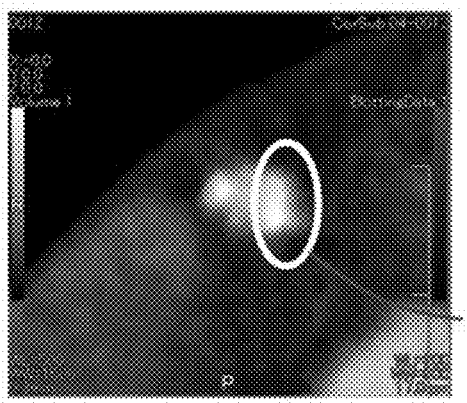
Figure 8:
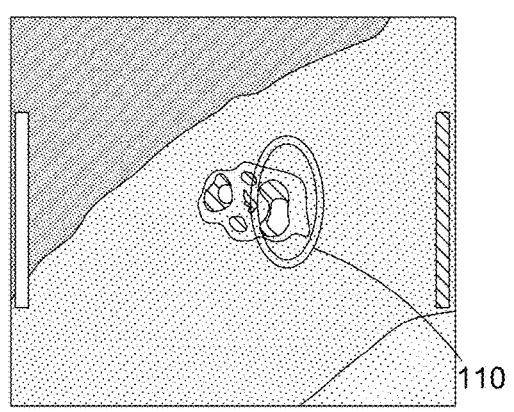

The clinician may conclude that the area of intensity highlighted on FIG. 8(a), FIG. 8(b) and FIG. 8(c) by oval 110 constitutes an area of calcium blooming (a calcium blooming artifact). The threshold of stage 60 and stage 78 may be set such that the threshold captures calcium blooming as well as real calcium. The clinician may expect that calcium blooming in the contrast (CCTA) image may be worse than calcium blooming in the non-contrast image, because it is known that calcium blooming may be worse in contrasted than in non-contrasted data. The clinician may interpret the intensities of the area surrounded by oval 110 as the result of increased calcium blooming in the CCTA scan relative to the contrast scan. The clinician may also decide that the artifact in oval 110 comprises some misregistration as described with reference to FIG. 7(*c*).

The clinician may choose to view the corresponding non-contrast image in conjunction with the contrast image to verify that the contrast image has greater calcium blooming.

Using the overlaid images produced in the above embodiments (for example, FIGS. 6(*b*) and 6(*c*) or FIGS. 7(*b*) and 7(*c*)), the clinician may be able to understand the cause of observed artifacts and judge when the artifacts are so severe that the subtraction data should not be trusted in a given region.

The clinician is presented with overlay images that reflect the actual image intensities and relative positions of the registered images. Therefore the clinician may be able to judge the effectiveness of the registration directly by examining the individual images and their combination. For example, the directly taken CT values of the non-contrast image may be overlaid with the directly taken CT values of the contrast image. The image produced has not been substantially processed other than in the normal rendering process. Therefore the clinician may have confidence in his or her understanding of the images.

The above embodiment describes the process by which the apparatus of FIG. 3 may produce images that may be used by a clinician in the assessment of artifacts. In the above embodiment, the overlay visualization was displayed for the entire image. The following alternative embodiment, relating to the flow chart of FIG. 9, describes an alternative mode in which the clinician may interact with the system, for example by selecting an artifact or area of interest from which to select the feature. Any aspects of the above embodiment may be combined with those of the following embodiment.

Figure 9:
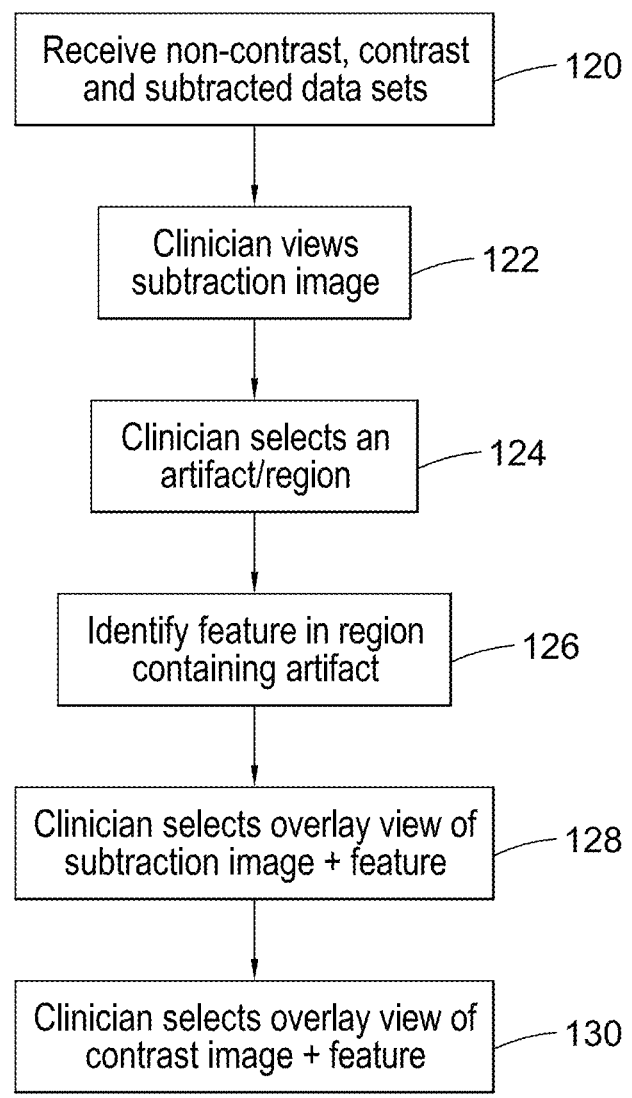
FIG. 9 is a flow chart illustrating in overview actions performed by an operator in selecting and viewing images, according to an embodiment.

FIG. 9 is a flow chart representing a clinician's interaction with the apparatus of FIG. 3 in selecting and viewing images relating to a subtraction image containing at least one artifact.

At stage 120, the data processing unit 34 receives a non-contrast data set, a contrast data set and a subtraction data set. The non-contrast data set and the contrast data set represent non-contrast and contrast scans of the same anatomical region of the same patient. In the present embodiment, the non-contrast data set and contrast data set were both acquired by the CT scanner 24 as part of the same examination of the same patient. The subtraction data set is the data set that is obtained by subtracting the intensity of each voxel of the non-contrast data set from the intensity of the corresponding voxel of the contrast data set.

At stage 122, the clinician views on display screen 26 a subtraction image that has been rendered from the subtraction data set by rendering unit 38.

At stage 124, the clinician selects an artifact or a region containing an artifact in the displayed subtraction image. In the present embodiment, the clinician uses the mouse 28 to click a first point on the screen, which is above and to the left of the artifact, and to drag a selection box to a second point on the screen, which is below and to the right of the artifact, thereby selecting a rectangular region of the image that includes the artifact. In alternative embodiments, the clinician selects a point on the artifact itself by a single click of the mouse 28 and the feature identification unit 36 selects a region of the image surrounding the point of the mouse click, where the size of the region may be predetermined. For example, the size of the region may be a fixed parameter in the system. Alternatively, the clinician may choose a region size.

In further embodiments, the clinician selects a point or region of the subtracted image by touching a touch screen, by using keyboard commands, by using a trackball, by pressing a button on an input console or by any suitable input method. In still further embodiments, the clinician suggests more than one point or region for feature identification.

In some embodiments, the clinician views the non-contrast image and/or contrast image at the same time as viewing the subtraction image. In other embodiments, the clinician views the non-contrast image and/or contrast image before or after viewing the subtraction image.

In some embodiments, the clinician selects a point or region on the non-contrast image for feature identification (for example, the clinician selects a region including a calcification). In other embodiments, the clinician selects a point or region on the contrast image for feature identification.

In a further embodiment, the clinician views the subtracted image, contrast image and non-contrast image simultaneously and may select a point or region on any of the displayed images for feature identification.

At stage 126, the feature identification unit 36 selects the part of the non-contrast data set that corresponds to the region that was selected in stage 124. Because the non-contrast data set and the contrast data set are registered to each other, it is possible to obtain the correct part of the non-contrast data set in response to a selection of a point or region on any of the non-contrast image, the contrast image or the subtracted image.

In the present embodiment, the feature identification unit 36 applies an intensity threshold to the part of the non-contrast data set that corresponds to the selected region. The feature identification unit 36 identifies as relevant voxels all voxels in that part of the non-contrast data set that meet the intensity threshold. Voxels that do not meet the intensity threshold are set to padding. Voxels that are not included in the part of the non-contrast data set that corresponds to the selected region are also set to padding. In other embodiments, another method of feature identification is used.

In some alternative embodiments, the feature identification unit 36 uses the selected region as a whole as the feature, rather than searching for the feature within the selected region.

At stage 128, the clinician selects an overlay view of the subtraction image and the feature. The rendering unit 28 renders an overlay image of the subtraction image and the feature. In the present embodiment, the clinician selects the overlay view by using a pre-determined keystroke command, for example 'O'. When the clinician is viewing the subtraction image, striking the 'O' key on the keyboard 28 changes the view between the subtraction image without an overlay (for example, FIG. 6(*a*)) to the subtraction image with the feature overlay (for example, FIG. 6(*b*)). By repeatedly striking the 'O' key, the clinician may toggle between the views with and without the feature overlay. In alternative embodiments, the rendering unit may be configured to switch between the combined image and a non-combined image (for example, the contrast image, non-contrast image, or subtraction image alone) in response to any other suitable user input.

At stage 130, the clinician selects an overlay view of the contrast image and the feature. The rendering unit 28 renders an overlay image of the subtraction image and the feature. In the present embodiment, the contrast image is not automatically displayed alongside the subtraction image. Therefore, the clinician first selects a contrast image view and the contrast image is displayed on the display screen 26. The clinician then selects an overlay, for example by hitting the 'O' key. The clinician may use the 'O' key to toggle between an overlaid and non-overlaid contrast image.

In further embodiments, the contrast image and subtraction image, or any other pair of medical images, are displayed simultaneously or successively on one or more display screens 26, either with or without the feature being overlaid. Hitting the 'O' key toggles between overlay view and non-overlay view on both the contrast image and the subtraction image simultaneously. The user may also provide input to instruct the rendering unit 38 to switch between displaying different ones of the pair of medical images.

In other embodiments, different commands are used by the clinician to summon the overlay view of the subtraction image or of the contrast image, or to switch between images. For example, the clinician may click an icon, type a command, touch an area of a touch screen, or any other appropriate input method. The clinician may position the mouse over an area of interest, causing the overlay to be displayed in the region indicated by the mouse pointer (lens window). Any display combination of the non-contrast image, contrast image, overlaid contrast image, subtraction image and overlaid subtraction image may be viewed. Visualization may be readily enabled and disabled or may be constantly available.

In further embodiments, the rendering unit 38 renders one or more thumbnail images which are displayed alongside display images. In one embodiment, when the clinician is viewing the subtraction image with no overlay, a thumbnail of an overlaid subtraction image is displayed. When the clinician selects the thumbnail, the overlaid subtraction image is displayed on the full screen. In another embodiment, when the clinician is viewing the subtraction image, thumbnail images of the contrast image and non-contrast image are displayed. Selecting the thumbnail image results in the appropriate image being displayed on the full screen. In a further embodiment, selecting a thumbnail image causes the corresponding image to be displayed alongside the image currently being viewed, or on separate windows or tabs of the same display screen. The rendering unit 38 may render thumbnails comprising any of the subtraction image, the contrast image, the non-contrast image, the overlaid subtraction image or the overlaid contrast image.

On viewing an overlay view of the subtraction image or the contrast image, the clinician may be presented with a fusion slider. The clinician may operate the fusion slider to mix between the feature and the subtraction image or contrast image, using different proportions in the fusion rendering. For example, for a subtraction image, the fusion slider may be such that, if the fusion slider is set to one end, the image displayed is the subtraction image only, without any feature overlay. If the fusion slider is set to the other end, the image displayed is the feature only, without the subtraction image. Each intermediate position of the fusion slider represents a particular proportion of the feature image value to the subtraction image value for each voxel in the overlaid image. The clinician may control the fusion slider using a mouse, using keyboard commands or by any other suitable input method. In some embodiments, the clinician may choose a color map to be used in rendering the overlaid image by fusion rendering. In further embodiments, a different control may be used to mix the feature image and the subtraction image to vary the proportions in the fusion rendering.

It is expected that the clinician will review the visualization (the overlaid subtraction image and/or the overlaid contrast image) as necessary to correctly interpret and improve confidence in the subtraction results. The visualization may combine all the relevant data and allow artifacts to be quickly understood. The visualization displays the relevant image values directly and independently from image processing.

In the embodiment of FIG. 9, the clinician reviews both the overlaid subtraction image and the overlaid contrast image. In further embodiments, the clinician may review only one of these images in some or all instances. For example, the clinician may use the overlaid contrast image to determine whether the registration is good without looking at the overlaid subtraction image.

In the embodiment of FIG. 9, the clinician selects first the overlaid subtraction image and then the overlaid contrast image. In further embodiments, after the clinician selects a point or region at stage 124, the rendering unit 38 renders one or both overlaid images automatically and displays them on the display screen instead of, or in addition to, the image currently being displayed.

Embodiments above describe the use of the processes of FIG. 4, FIG. 5 and/or FIG. 9 to assess artifacts in sets of coronary artery image data. In alternative embodiments, the sets of image data may relate to other vessels, including but not limited to blood vessels such as arteries, veins, carotid arteries and renal arteries.

In some embodiments, the feature identification unit is configured to produce a modified version of the first image data set representing a modified version of the first medical image in which for each pixel or voxel of the first image data set that is not part of the feature, the value of the pixel or voxel is set to a default value, and the rendering unit is configured to render the combined image by overlaying the modified version of the first medical image and said one of the subtraction image and the second medical image.

Although embodiments have been described in relation to the processing of CT data, embodiments may be used to process any suitable type of medical image data, for example X-ray data, MRI data or PET data. Although embodiments have been described in relation to contrast data and non-contrast data, any data types that are suitable for subtraction may be used.

Whilst particular units have been described herein, in alternative embodiments functionality of one or more of these units can be provided by a single unit, processing resource or other component, or functionality provided by a single unit can be provided by two or more units or other components in combination. Reference to a single unit encompasses multiple components providing the functionality of that unit, whether or not such components are remote from one another, and reference to multiple units encompasses a single component providing the functionality of those units.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An apparatus for visualizing medical image data, comprising:
processing circuitry configured to
obtain first image data representing a first medical image and second, different image data representing a second medical image;
register the first medical image data and the second, different medical image data;
obtain subtraction image data representing a subtraction image by, following the registering, subtracting one of the first medical image data and the second, different medical image data from the other of the first medical image data and the second, different medical image data;
process the first image data representing the first medical image to identify an anatomical feature or stent;
display, on at least one display screen, a combined image comprising an overlay of the identified anatomical feature or stent from the first medical image data and one of the subtraction image and the second, different medical image such that the identified anatomical feature or stent and at least one corresponding anatomical feature or stent from the subtraction image or the second medical image at least partially overlap, wherein the corresponding anatomical feature or stent is associated with an image artifact.

2. The apparatus according to claim 1, wherein the subtraction image includes at least one image artifact associated with the anatomical feature or stent.

3. The apparatus according to claim 1, wherein the image artifact comprises at least one of a subtraction artifact, a misregistration artifact, and a blooming artifact.

4. The apparatus according to claim 1, wherein at least one of the first medical image data, the second, different medical image data, and the subtraction image data is registered to at least one other of the first medical image data, the second, different medical image data, and the subtraction image data.

5. The apparatus according to claim 1, wherein one of the first medical image data and the second, different medical image data comprises non-contrast image data, and the other of the first medical image data and the second, different medical image data comprises contrast image data.

6. The apparatus according to claim 1, wherein the identified anatomical feature comprises or is associated with at least one of a calcification, a stent, a region of bone, a region of soft tissue, and an organ.

7. The apparatus according to claim 1, wherein the combined image is rendered such that the identified anatomical feature or stent is visually distinguished from said subtraction image or the second medical image.

8. The apparatus according to claim 7, wherein the processing circuitry is further configured to render the combined image such that at least one of a brightness, color, texture, or shading is different in the combined image for the identified anatomical feature or stent than for said subtraction image or the second medical image.

9. The apparatus according to claim 1 wherein rendering the combined image comprises at least one of:
rendering the identified anatomical feature or stent in color and the subtraction image or the second medical image in grayscale;
rendering the identified anatomical feature or stent in grayscale and the subtraction image or the second medical image in color; and
rendering the identified anatomical feature or stent and the subtraction image or the second medical image in contrasting colors.

10. The apparatus according to claim 9, wherein the rendering of the combined image comprises fusion rendering of the identified anatomical feature or stent with the subtraction image or the second medical image.

11. The apparatus according to claim 1, wherein the processing circuitry is further configured to render a first combined image comprising an overlay of the identified anatomical feature or stent with the subtraction image and to render a second combined image comprising an overlay of the identified anatomical feature or stent with the second medical image.

12. The apparatus according to claim 11, wherein the processing circuitry is further configured to switch between display of the first combined image and display of the second combined image in response to user input.

13. The apparatus according to claim 1, wherein the processing circuitry is further configured to switch between display of the combined image and display of at least one of the first medical image, the second medical image, and the subtraction image in response to user input.

14. The apparatus according to claim 13, wherein the switching of the display between the combined image and the display of at least one of the first medical image, the second medical image, and the subtraction image causes at least part of the image artifact to be revealed or obscured.

15. The apparatus according to claim 1, wherein the processing circuitry is further configured to display the combined image and at least one of the first medical image, the second medical image, and the subtraction image simultaneously.

16. The apparatus according to claim 1, wherein the processing circuitry is further configured to vary the appearance of the combined image in response to user input.

17. The apparatus according to claim 16, wherein the processing circuitry is further configured to vary in the combined image at least one of a fusion parameter, transparency, color, and brightness of the identified feature or of the subtraction image or the second medical image, in response to user input.

18. The apparatus according to claim 1, wherein processing the image data representing the first medical image to identify an anatomical feature or stent comprises at least one of:
applying an intensity threshold;
using image processing methods to identify the anatomical feature or stent; and
segmentation of the anatomical feature or stent.

19. An apparatus according to claim 1, wherein:
the processing circuitry is further configured to
produce a modified version of the first image data representing a modified version of the first medical image in which for each pixel or voxel of the first image data that is not part of the feature or stent, the value of the pixel or voxel is set to a default value; and
render the combined image by overlaying the modified version of the first medical image and said one of the subtraction image and the second medical image.

20. The apparatus according to claim 1, wherein the identification of the anatomical feature or stent by the processing circuitry comprises selecting a region of the first medical image.

21. The apparatus according to claim 20, wherein the processing circuitry is further configured to identify the anatomical feature or stent within the selected region.

22. The apparatus according to claim 20, wherein the region is selected in response to user input.

23. The apparatus according to claim 1, wherein each of the first medical image data and the second, different medical image data comprises at least one of CT data, X-ray data, MRI data, and PET data.

24. A method for visualizing medical image data, comprising:

obtaining first image data representing a first medical image and second, different image data representing a second medical image;

registering the first medical image data and the second, different medical image data;

obtaining subtraction image data representing a subtraction image by, following the registering, subtracting one of the first medical image data and the second, different medical image data from the other of the first medical image data and the second, different medical image data;

processing the image data representing the first medical image to identify an anatomical feature or stent; and displaying on at least one display screen a combined image comprising an overlay of the identified anatomical feature or stent from the first medical image and one of the subtraction image and the second medical image such that the identified anatomical feature or stent and at least one corresponding anatomical feature or stent from the subtraction image or the second medical image at least partially overlap, wherein the corresponding anatomical feature or stent is associated with an image artifact.

25. The method according to claim 24, wherein the subtraction image includes at least one image artifact associated with the anatomical feature or stent.

* * * * *